United States Patent
Cabral et al.

(10) Patent No.: US 8,860,722 B2
(45) Date of Patent: Oct. 14, 2014

(54) EARLY Z SCOREBOARD TRACKING SYSTEM AND METHOD

(75) Inventors: Brian Cabral, San Jose, CA (US); Edward A. Hutchins, Mountain View, CA (US); Christopher Donham, San Mateo, CA (US)

(73) Assignee: NVIDIA Corporation, Santa Clara, CA (US)

(*) Notice: Subject to any disclaimer, the term of this patent is extended or adjusted under 35 U.S.C. 154(b) by 974 days.

(21) Appl. No.: 12/002,732

(22) Filed: Dec. 17, 2007

(65) Prior Publication Data

US 2008/0246764 A1    Oct. 9, 2008

Related U.S. Application Data

(63) Continuation-in-part of application No. 10/846,208, filed on May 14, 2004, which is a continuation-in-part of application No. 10/845,662, filed on May 14, 2004, now Pat. No. 8,711,155.

(60) Provisional application No. 60/964,929, filed on Aug. 15, 2007.

(51) Int. Cl.
*G06T 15/40* (2011.01)
*G09G 5/00* (2006.01)
*G06T 1/20* (2006.01)
*G06T 15/00* (2011.01)

(52) U.S. Cl.
CPC .............. *G06T 15/005* (2013.01); *G06T 1/20* (2013.01); *G06T 15/405* (2013.01)
USPC ........................................ 345/422; 345/581

(58) Field of Classification Search
CPC ................ G06T 15/405; G06T 1/20
USPC .................................... 345/422, 581
See application file for complete search history.

(56) References Cited

U.S. PATENT DOCUMENTS 4,620,217 A   10/1986   Songer
4,648,045 A    3/1987   Demetrescu (Continued)

FOREIGN PATENT DOCUMENTS

CN    1954338    5/2004
CN    101091203  5/2004

(Continued)

OTHER PUBLICATIONS

Pixar, Inc.; PhotoRealistic RenderMan 3.9 Shading Language Extensions; Sep. 1999.*

(Continued)

*Primary Examiner* — David T Welch

(57) ABSTRACT

Early Z scoreboard tracking systems and methods in accordance with the present invention are described. Multiple pixels are received and a pixel depth raster operation is performed on the pixels. The pixel depth raster operation comprises discarding a pixel that is occluded. In one exemplary implementation, the depth raster operation is done at a faster rate than a color raster operation. Pixels that pass the depth raster operation are checked for screen coincidence. Pixels with screen coincidence are stalled and pixels without screen coincidence are forwarded to lower stages of the pipeline. The lower stages of the pipeline are programmable and pixel flight time can vary (e.g., can include multiple passes through the lower stages). Execution through the lower stages is directed by a program sequencer which also directs notification to the pixel flight tracking when a pixel is done processing.

17 Claims, 4 Drawing Sheets

(56) References Cited

U.S. PATENT DOCUMENTS

| | | | |
|---|---|---|---|
| 4,667,308 A | 5/1987 | Hayes et al. | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,268,995 A * | 12/1993 | Diefendorff et al. | 345/422 |
| 5,270,687 A | 12/1993 | Killebrew, Jr. | |
| 5,285,323 A | 2/1994 | Hetherington et al. | |
| 5,357,604 A | 10/1994 | San et al. | |
| 5,392,393 A | 2/1995 | Deering | |
| 5,487,022 A * | 1/1996 | Simpson et al. | 708/205 |
| 5,488,687 A | 1/1996 | Rich | |
| 5,491,496 A | 2/1996 | Tomiyasu | |
| 5,557,298 A | 9/1996 | Yang et al. | |
| 5,577,213 A | 11/1996 | Avery et al. | |
| 5,579,473 A | 11/1996 | Schlapp et al. | |
| 5,579,476 A | 11/1996 | Cheng et al. | |
| 5,581,721 A | 12/1996 | Wada et al. | |
| 5,600,584 A | 2/1997 | Schlafly | |
| 5,604,824 A | 2/1997 | Chui et al. | |
| 5,613,050 A * | 3/1997 | Hochmuth et al. | 345/422 |
| 5,655,132 A | 8/1997 | Watson | |
| 5,701,444 A | 12/1997 | Baldwin | |
| 5,748,202 A | 5/1998 | Nakatsuka et al. | |
| 5,764,228 A * | 6/1998 | Baldwin | 715/797 |
| 5,777,628 A | 7/1998 | Buck-Gengler | |
| 5,808,617 A | 9/1998 | Kenworthy et al. | |
| 5,818,456 A | 10/1998 | Cosman et al. | |
| 5,831,640 A | 11/1998 | Wang et al. | |
| 5,844,569 A | 12/1998 | Eisler et al. | |
| 5,850,572 A | 12/1998 | Dierke | |
| 5,864,342 A | 1/1999 | Kajiya et al. | |
| 5,941,940 A | 8/1999 | Prasad et al. | |
| 5,977,977 A | 11/1999 | Kajiya et al. | |
| 5,995,121 A | 11/1999 | Alcorn et al. | |
| 6,002,410 A | 12/1999 | Battle | |
| 6,118,452 A | 9/2000 | Gannett | |
| 6,166,743 A * | 12/2000 | Tanaka | 345/422 |
| 6,173,366 B1 | 1/2001 | Thayer et al. | |
| 6,222,550 B1 * | 4/2001 | Rosman et al. | 345/419 |
| 6,229,553 B1 | 5/2001 | Duluk, Jr. et al. | |
| 6,259,460 B1 | 7/2001 | Gossett et al. | |
| 6,259,461 B1 | 7/2001 | Brown | |
| 6,288,730 B1 | 9/2001 | Duluk, Jr. | |
| 6,313,846 B1 | 11/2001 | Fenney et al. | |
| 6,333,744 B1 | 12/2001 | Kirk et al. | |
| 6,351,806 B1 | 2/2002 | Wyland | |
| 6,353,439 B1 | 3/2002 | Lindholm et al. | |
| 6,407,740 B1 | 6/2002 | Chan | |
| 6,411,130 B1 | 6/2002 | Gater | |
| 6,411,301 B1 | 6/2002 | Parikh et al. | |
| 6,417,851 B1 | 7/2002 | Lindholm et al. | |
| 6,466,222 B1 | 10/2002 | Kao et al. | |
| 6,496,537 B1 | 12/2002 | Kranawetter et al. | |
| 6,516,032 B1 | 2/2003 | Heirich et al. | |
| 6,525,737 B1 | 2/2003 | Duluk, Jr. et al. | |
| 6,526,430 B1 | 2/2003 | Hung et al. | |
| 6,542,971 B1 | 4/2003 | Reed | |
| 6,557,022 B1 | 4/2003 | Sih et al. | |
| 6,597,363 B1 | 7/2003 | Duluk, Jr. et al. | |
| 6,604,188 B1 | 8/2003 | Coon et al. | |
| 6,624,818 B1 | 9/2003 | Mantor et al. | |
| 6,636,214 B1 | 10/2003 | Leather et al. | |
| 6,636,221 B1 | 10/2003 | Morein | |
| 6,636,223 B1 | 10/2003 | Morein | |
| 6,664,958 B1 * | 12/2003 | Leather et al. | 345/422 |
| 6,670,955 B1 | 12/2003 | Morein | |
| 6,693,643 B1 | 2/2004 | Trivedi et al. | |
| 6,717,577 B1 | 4/2004 | Cheng et al. | |
| 6,731,288 B2 | 5/2004 | Parsons et al. | |
| 6,734,861 B1 | 5/2004 | Van Dyke et al. | |
| 6,745,390 B1 | 6/2004 | Reynolds et al. | |
| 6,778,181 B1 | 8/2004 | Kilgariff et al. | |
| 6,806,886 B1 | 10/2004 | Zatz | |
| 6,819,331 B2 | 11/2004 | Shih et al. | |
| 6,839,828 B2 | 1/2005 | Gschwind et al. | |
| 6,879,328 B2 | 4/2005 | Deering | |
| 6,912,695 B2 | 6/2005 | Ernst et al. | |
| 6,924,808 B2 | 8/2005 | Kurihara et al. | |
| 6,947,053 B2 | 9/2005 | Malka et al. | |
| 6,980,209 B1 | 12/2005 | Donham et al. | |
| 6,980,222 B1 | 12/2005 | Marion et al. | |
| 6,999,100 B1 | 2/2006 | Leather et al. | |
| 7,034,828 B1 * | 4/2006 | Drebin et al. | 345/426 |
| 7,042,462 B2 | 5/2006 | Kim et al. | |
| 7,145,566 B2 | 12/2006 | Karlov | |
| 7,158,141 B2 | 1/2007 | Chung et al. | |
| 7,187,383 B2 | 3/2007 | Kent | |
| 7,257,814 B1 | 8/2007 | Melvin et al. | |
| 7,280,112 B1 | 10/2007 | Hutchins | |
| 7,298,375 B1 | 11/2007 | Hutchins | |
| 7,450,120 B1 | 11/2008 | Hakura et al. | |
| 7,477,260 B1 | 1/2009 | Nordquist | |
| 7,659,909 B1 | 2/2010 | Hutchins | |
| 7,710,427 B1 | 5/2010 | Hutchins et al. | |
| 7,928,990 B2 | 4/2011 | Jiao et al. | |
| 7,941,645 B1 | 5/2011 | Riach et al. | |
| 7,969,446 B2 | 6/2011 | Hutchins et al. | |
| 8,537,168 B1 | 9/2013 | Steiner et al. | |
| 2002/0105519 A1 | 8/2002 | Lindholm et al. | |
| 2002/0126126 A1 | 9/2002 | Baldwin | |
| 2002/0129223 A1 | 9/2002 | Takayama et al. | |
| 2002/0169942 A1 | 11/2002 | Sugimoto | |
| 2003/0115233 A1 | 6/2003 | Hou et al. | |
| 2003/0189565 A1 | 10/2003 | Lindholm et al. | |
| 2004/0012597 A1 * | 1/2004 | Zatz et al. | 345/501 |
| 2004/0012599 A1 | 1/2004 | Laws | |
| 2004/0012600 A1 | 1/2004 | Deering et al. | |
| 2004/0024260 A1 | 2/2004 | Winkler et al. | |
| 2004/0078504 A1 | 4/2004 | Law et al. | |
| 2004/0100474 A1 | 5/2004 | Demers et al. | |
| 2004/0114813 A1 | 6/2004 | Boliek et al. | |
| 2004/0119710 A1 * | 6/2004 | Piazza et al. | 345/422 |
| 2004/0126035 A1 | 7/2004 | Kyo | |
| 2004/0130552 A1 | 7/2004 | Duluk, Jr. et al. | |
| 2004/0246260 A1 | 12/2004 | Kim et al. | |
| 2005/0122330 A1 | 6/2005 | Boyd et al. | |
| 2005/0134588 A1 | 6/2005 | Aila et al. | |
| 2005/0135433 A1 | 6/2005 | Chang et al. | |
| 2005/0162436 A1 * | 7/2005 | Van Hook et al. | 345/546 |
| 2005/0223195 A1 | 10/2005 | Kawaguchi | |
| 2005/0231506 A1 * | 10/2005 | Simpson et al. | 345/422 |
| 2005/0237337 A1 * | 10/2005 | Leather et al. | 345/582 |
| 2005/0280655 A1 | 12/2005 | Hutchins et al. | |
| 2006/0007234 A1 | 1/2006 | Hutchins et al. | |
| 2006/0028469 A1 | 2/2006 | Engel | |
| 2006/0152519 A1 | 7/2006 | Hutchins et al. | |
| 2006/0155964 A1 | 7/2006 | Totsuka | |
| 2006/0177122 A1 | 8/2006 | Yasue | |
| 2006/0288195 A1 | 12/2006 | Ma et al. | |
| 2007/0165029 A1 * | 7/2007 | Lee et al. | 345/426 |
| 2007/0279408 A1 | 12/2007 | Zheng et al. | |
| 2007/0285427 A1 | 12/2007 | Morein et al. | |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 05150979 A2 | 6/1993 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 5/2004 |
| WO | 2006007127 | 5/2004 |
| WO | 2005114582 | 12/2005 |

OTHER PUBLICATIONS http://www.encyclopedia.com/html/s1/sideband.asp.

(56) References Cited

OTHER PUBLICATIONS

PCT Notification of Transmittal of The International Search Report and The Written Opinion of the International Searching Authority, or the Declaration. PCT/US05/17032; Applicant NVIDA Corporation; Mail Date Nov. 9, 2005.

PCT Notificaiton of Transmittal of The International Search Report or the Declaration. PCT/US05/17526; Applicant Hutchins, Edward A; Mail Date Jan. 17, 2006.

PCT Notificaiton of Transmittal of The International Search Report and The Written Opinion of the International Searching Authority, or the Declaration. PCT/US05/17031; Applicant NVIDA Corporation; Mail Date Feb. 9, 2007.

Hutchins et al, Patent Application Entitled "A Unified Data Fetch Graphics Processing System and Method", U.S. Appl. No. 10/845,986, filed May 14, 2004.

Hutchins et al, Patent Application Entitled "An Early Kill Removal Graphics Processing System and Method", U.S. Appl. No. 10/845,662, filed May 14, 2004.

Battle, J., Patent Application Entitled "Arbitrary Size Texture Palettes For Use in Graphics Systems", U.S. Appl. No. 10/845,664, filed May 14, 2004.

Hutchins et al., Patent Application Entitled "A Single Thread Graphics Processing System and Method", U.S. Appl. No. 10/846,192, filed May 14, 2004.

"Interleaved Memory." Dec. 26, 2002. http://www.webopedia.com/TERM/I/interleaved_memory.html.

Pirazzi, Chris. "Fields, F1/F2, Interleave, Field Dominance And More." Nov. 4, 2001. http://lurkertech.com/lg/dominance.html.

Hennessy, et al., Computer Organization and Design: The Hardware/Software Interface, 1997, Section 6.5.

Moller, et al.; Real-Time Rendering, 2nd ed., 2002, A K Peters Ltd., pp. 92-99, 2002.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

The Free Online Dictionary, Thesaurus and Encyclopedia, definition for cache; http://www.thefreedictionary.com/cache; retrieved Aug. 17, 2012.

Wolfe A, et al., "A Superscalar 3D graphics engine", MICRO-32. Proceedings of the 32nd annual ACM/IEEE International Symposium on Microarchitecture. Haifa, Israel, Nov. 16-18, 1999.

Zaharieva-Stoyanova E I: "Data-flow analysis in superscalar computer architecture execution," Tellecommunications in Modern Satellite, Cable and Broadcasting Services, 2003.

* cited by examiner

EARLY Z SCOREBOARD TRACKING SYSTEM AND METHOD

RELATED APPLICATIONS

The present application claims the benefit of and priority to copending Provisional Application 60/964929 entitled an Early Z Scoreboard Tracking System and Method filed on Aug. 15, 2007, which is incorporated herein by this reference. The present Application is also a Continuation in Part and claims the benefit and priority of the following copending commonly assigned U.S. patent applications entitled:

"A Coincident Graphics Pixel Scoreboard Tracking System and Method" by Hutchins et al. filed on May 14, 2004, Ser. No. 10/846,208; and "An Early Kill Removal Graphics Processing System and Method" by Hutchins et al. filed on May 14, 2004 Ser. No. 10/845,662;

which are hereby incorporated by this reference.

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presentation of graphical images to the user. Displaying graphics images traditionally involves intensive data processing and coordination requiring considerable resources and often consuming significant power.

An image is typically represented as a raster (an array) of logical picture elements (pixels). Pixel data corresponding to certain surface attributes of an image (e.g. color, depth, texture, etc.) are assigned to each pixel and the pixel data determines the nature of the projection on a display screen area associated with the logical pixel. Conventional three dimensional graphics processors typically involve extensive and numerous sequential stages or "pipeline" type processes that manipulate the pixel data in accordance with various vertex parameter values and instructions to map a three dimensional scene in the world coordinate system to a two dimensional projection (e.g., on a display screen) of an image. A relatively significant amount of processing and memory resources are usually required to implement the numerous stages of a traditional pipeline.

A number of new categories of devices (e.g., such as portable game consoles, portable wireless communication devices, portable computer systems, etc.) are emerging where size and power consumption are a significant concern. Many of these devices are small enough to be held in the hands of a user making them very convenient and the display capabilities of the devices are becoming increasingly important as the underlying fundamental potential of other activities (e.g., communications, game applications, internet applications, etc.) are increasing. However, the resources (e.g., processing capability, storage resources, etc.) of a number of the devices and systems are usually relatively limited. These limitations can make retrieving, coordinating and manipulating information associated with a final image rendered or presented on a display very difficult or even impossible. In addition, traditional graphics information processing can consume significant power and be a significant drain on limited power supplies, such as a battery.

SUMMARY

Early z scoreboard tracking systems and methods in accordance with the present invention are described herein. In one embodiment, multiple pixels are received and a pixel depth raster operation is performed on the pixels. The pixel depth raster operation comprises discarding a pixel that is occluded. In one exemplary implementation, the depth raster operation is done at a faster rate than a color raster operation. Pixels that pass the depth raster operation are checked for screen coincidence. Pixels with screen coincidence are stalled and pixels without screen coincidence are forwarded to lower stages of the pipeline. The lower stages of the pipeline are programmable and pixel flight time can vary (e.g., can include multiple passes through the lower stages). Execution through the lower stages is directed by a program sequencer which also directs notification to the pixel flight tracking when a pixel is done processing.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
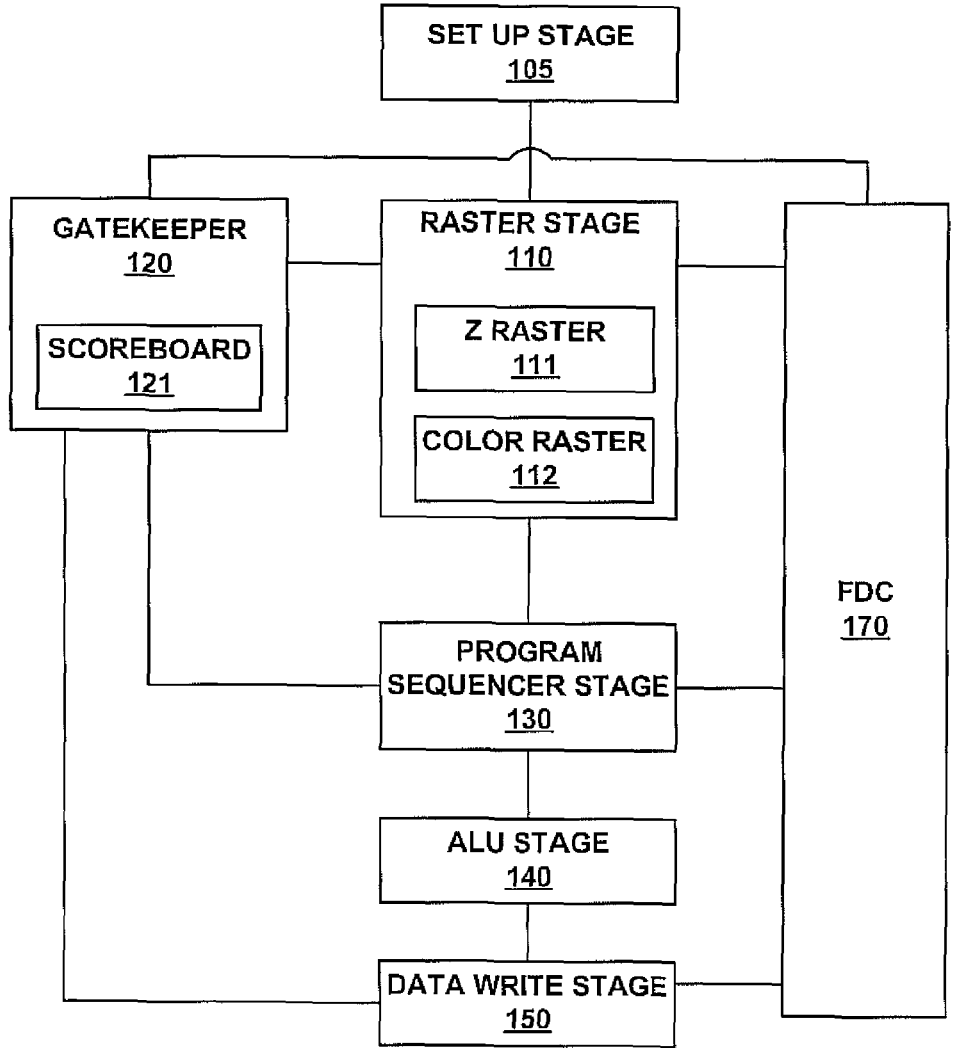
FIG. 1 is a block diagram of an exemplary graphics pipeline in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

The present invention provides efficient and convenient graphics data organization and processing. A present invention graphics system and method can facilitate presentation of graphics images with a reduced amount of resources dedicated to graphics information processing and can also facilitate increased power conservation. In one embodiment of the present invention, processing of graphics information is simplified and coordination of graphics information between different pixels is facilitated. For example, if pixel data does not impact (e.g., contributes to, modifies, etc.) the image display presentation, power dissipated processing the information is minimized by "killing" the pixel (e.g., not clocking the pixel packet payload through the graphics pipeline). Alternatively, the pixel packet can be removed from the graphics pipeline all together. Information retrieval can also be coordinated to ensure information is being retrieved and forwarded in the proper sequence (e.g., to avoid improper screen coincidence, multiple pass issues, read-modify-write problems, etc.). In addition, embodiments of the present invention can provide flexible organization of graphics information and facilitate programmable multiple pipeline passes.

FIG. 1 is a block diagram of an exemplary graphics pipeline 100 in accordance with one embodiment of the present invention. Graphics pipeline 100 facilitates efficient and effective utilization of processing resources. In one embodiment, graphics pipeline 100 processes graphics information in an organized and coordinated manner. Graphics pipeline 100 can be implemented as a graphics processing core in a variety of different components (e.g., in a graphics processing chip or unit, in an application specific integrated circuit, a central processing unit, integrated in a host processing unit, etc.). Various aspects graphics pipeline 100 and other embodiments of the present invention are described in portions of the following description as operating upon graphics primitives, (e.g., triangles) as a matter of convenient convention. It is appreciated that the present invention is readily adaptable and can be also implemented utilizing a variety of other geometrical primitives.

Graphics pipeline 100 includes setup stage 105, raster stage 110, gatekeeper stage 120, program sequence sage 130, arithmetic logic unit stage 140 and data write stage 150. In one embodiment of the present invention, a host provides graphics pipeline 100 with vertex data (e.g., points in three dimensional space that are being rendered), commands for rendering particular triangles given the vertex data, and programming information for the pipeline (e.g., register writes for loading instructions into different graphics pipeline 100 stages). The stages of graphics pipeline 100 cooperatively operate to process graphics information.

Setup stage 105 receives vertex data and prepares information for processing in graphics pipeline 100. Setup stage 105 can perform geometrical transformation of coordinates, perform viewport transforms, perform clipping and prepare perspective correct parameters for use in raster stage 110, including parameter coefficients. In one embodiment, the setup unit applies a user defined view transform to vertex information (e.g., x, y, z, color and/or texture attributes, etc.) and determines screen space coordinates for each triangle. Setup stage 105 can also support guard-band clipping, culling of back facing triangles (e.g., triangles facing away from a viewer), and determining interpolated texture level of detail (e.g., level of detail based upon triangle level rather than pixel level). In addition, setup stage 105 can collect statistics and debug information from other graphics processing blocks.

Setup stage 105 can include a vertex buffer (e.g., vertex cache) that can be programmably controlled (e.g., by software, a driver, etc.) to efficiently utilize resources (e.g., for different bit size word vertex formats). For example, transformed vertex data can be tracked and saved in the vertex buffer for future use without having to perform transform operations for the same vertex again. In one embodiment, setup stage 105 sets up barycentric coefficients for raster 110. In one exemplary implementation, setup stage 105 is a floating point Very Large Instruction Word (VLIW) machine that supports 32-bit IEEE float, S15.16 fixed point and packed 0.8 fixed point formats.

Raster stage 110 determines which pixels correspond to a particular triangle and interpolates parameters from setup stage 105 associated with the triangle to provide a set of interpolated parameter variables and instruction pointers or sequence numbers associated with (e.g., describing) each pixel. For example, raster stage 100 can provide a "translation" or rasterization from a triangle view to a pixel view of an image. In one embodiment, raster stage 110 scans or iterates each pixel in an intersection of a triangle and a scissor rectangle. For example, raster stage 110 can process pixels of a given triangle and determine which processing operations are appropriate for pixel rendering (e.g., operations related to color, texture, depth and fog, etc.). Raster stage 110 can support guard band (e.g., +/−1K) coordinates providing efficient guard-band rasterization of on-screen pixels and facilitates reduction of clipping operations. In one exemplary implementation, raster stage 110 is compatible with Open GL-ES and D3DM rasterization rules. Raster stage 110 is also programmable to facilitate reduction of power that would otherwise be consumed by unused features and faster rendering of simple drawing tasks, as compared to a hard-coded rasterizer unit in which features consume time or power (or both) whether or not they are being used.

In one embodiment, raster stage 110 also generates pixel packets utilized in graphics pipeline 100. Each pixel packet includes one or more rows and each row includes a payload portion and a sideband portion. A payload portion includes fields for various values including interpolated parameter values (e.g., values that are the result of raster interpolation operations). For example, the fields can be created to hold values associated with pixel surface attributes (e.g., color, texture, depth, fog, (x,y) location, etc.). Instruction sequence numbers associated with the pixel processing are assigned to the pixel packets and placed in an instruction sequence field of the sideband portion. The sideband information also includes a status field (e.g., kill field).

In one embodiment, raster stage 110 calculates barycentic coordinates for pixel packets. In a barycentric coordinate system, distances in a triangle are measured with respect to its vertices. The use of barycentric coordinates reduces the required dynamic range, which permits using fixed point calculations that require less power than floating point calculations. In one embodiment, raster stage 110 can also interleave even number pixel rows and odd number pixel rows to account for multiclock cycle latencies of downstream pipestages.

A present invention graphics pipeline system and method can facilitate efficient utilization of resources by limiting processing on pixels that do not contribute to an image display presentation. Z Raster stage 111 performs an analysis to determine relatively "early" in the graphics pipeline if a pixel contributes to the image display presentation. For example, an analysis of whether a pixel is occluded (e.g., has values associated with "hidden" surfaces that do not contribute to an image display presentation) is performed. In one embodiment, a pixel packet row is not clocked through (e.g., CMOS components for the payload portion do not switch) for killed pixels. The present invention can prevent power being consumed on processing for pixels that would otherwise be discarded at the end of the pipeline. The raster stage removes pixel information (e.g., pixel packet rows) associated with the pixel from the pipeline if the information does not contribute to the image display presentation and notifies gatekeeper 120. Color raster stage 112 performs color raster operations.

In one embodiment, Z raster is done at a faster rate than color raster. In one exemplary implementation, Z raster operations are performed on four pixels are at a time and the pixels that are discarded are "finished" faster than the pixels that go through color rasterizing. The discarding of some pixels while others rasterized at the same time proceed to the lower stages of the pipeline introduce timing issues that are handled by the scoreboarding and program sequencing described below. The scoreboarding and program sequencing also handle timing issues associated with variable length programmable shader operations that can include re-circulating a pixel through pipeline stages multiple passes.

Gatekeeper stage 120 of FIG. 1A regulates the flow of pixels to lower stages of graphics pipeline 100. In one exemplary implementation, gatekeeper 120 also collects debug readback information from other graphics pipeline 100 stages (e.g., can handle debug register reads). In one embodiment of the present invention, gatekeeper stage 120 facilitates data coherency maintenance of data fetching and data writing. For example, gatekeeper stage 120 can prevent read-modify-write hazards by coordinating entrance of coincident pixels into subsequent stages of graphics pipeline 100 with on going read-modify-write operations.

In one embodiment, gatekeeper stage 120 utilizes scoreboarding techniques to track and identify coincident pixel issues. Gatekeeper stage 120 can also utilize the scoreboard to track pixels that finish processing through the pipeline (e.g., by being written to memory or being killed). Scoreboard 121 facilitates coordination of pixels in a pipeline to maintain an appropriate processing flow (e.g., the order in which an application drew a triangle). For example, it is possible for an application to direct one triangle to be rendered over the top of another triangle and it is possible for a pixel associated with the second triangle to be coincident (e.g., have the same screen location) with a pixel from the first triangle.

Scoreboard 121 tracks the screen locations of pixels that are in "flight" and being processed by downstream stages of the graphics pipeline. Scoreboard 121 prevents a hazard where one pixel in a triangle is coincident ("on top of") another pixel being processed and in flight but not yet retired. For example, when a pixel packet is received at gatekeeper stage 120, the screen location for the pixel packet is stored at scoreboard 121. When a second pixel packet having the same screen location is received, scoreboard 121 indicates that another pixel with that screen location is currently being processed by downstream stages of graphics pipeline. In one embodiment, scoreboard 121 is implemented as a bit mask. In one exemplary implementation, the bit mask is a grid of bits for indicating whether a pixel having a particular (x, y) location is busy (e.g., being processed by graphics pipeline).

In one embodiment, gatekeeper stage 120 directs raster stage 110 to stall propagation of the new pixel to downstream stages in response to detecting screen coincidence between the pixel and pixels currently processing. Upon completion of processing for a pixel packet, a message is sent from data write stage 150 to gatekeeper stage 120 indicating that the pixel has completed processing. In response to receiving the message, scoreboard 121 is updated to indicate that the screen location associated with the pixel is now free, and that processing can commence on another pixel having the same screen location. In one embodiment, the corresponding bit in a bit mask is cleared.

Program sequencer (P Seq) 130 functions by controlling the operation of the other downstream components of the graphics pipeline 100. In one embodiment program sequencer 130 works in conjunction with a graphics driver to implement a method for loading and executing a programmable shader. The program sequencer 130 can interact with the graphics driver (e.g., a graphics driver executing on the CPU) to control the manner in which the functional modules of the graphics pipeline 100 receive information, configure themselves for operation, and process graphics primitives. For example, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the lower pipeline stage over a common input from upstream pipeline stages (e.g., from an upstream raster module, from a setup module, or from the graphics driver).

In one exemplary implementation the program sequencer 130 directs execution of an indeterminate length shader program. As used herein, the term "indefinite length" shader program refers to the fact that the shader programs that can be executed by a GPU are not arbitrarily limited by a predetermined, or format based, length. Thus for example, shader programs that can be executed can be short length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc)

or the like. In one embodiment, program sequencer 130 directs execution of indeterminate length shader programs by executing them in portions.

P Seq. 130 is also responsible for fetching (e.g., reading) a plurality of different data types (e.g., color data, depth data, texture data, etc.) from a memory (e.g., memory 132) in a single stage. In one embodiment, a variety of different types of surface attribute information from memory 170, including surface information related to pixels (e.g., pixels generated by a rasterization module). The surface information can also be associated with a plurality of graphics functions to be performed on the pixels and wherein the surface information is stored in pixel information (e.g., a pixel packet) associated with the pixels. The plurality of graphics functions can include color blending and texture mapping. In one exemplary implementation, program sequencer 130 directs a recirculation data path for recirculating pixel information through shading and texture operations multiple for multiple passes or loops.

Arithmetic logic stage 140 (e.g., an ALU) of FIG. 1A performs shading coordination operations on pixel packet row payload information (e.g., pixel surface attribute information) received from data fetch stage 130. The arithmetic logic stage 140 can also perform texture operations.

Data write stage 150 forwards pixel processing results (e.g., color results, Z-depth results, etc.) out to memory. In one embodiment data write stage 150 forwards the results to fragment data cache 170. In one exemplary implementation, data write stage forwards an indication to scoreboard 121 the pixel is no longer in flight.

Figure 2A:
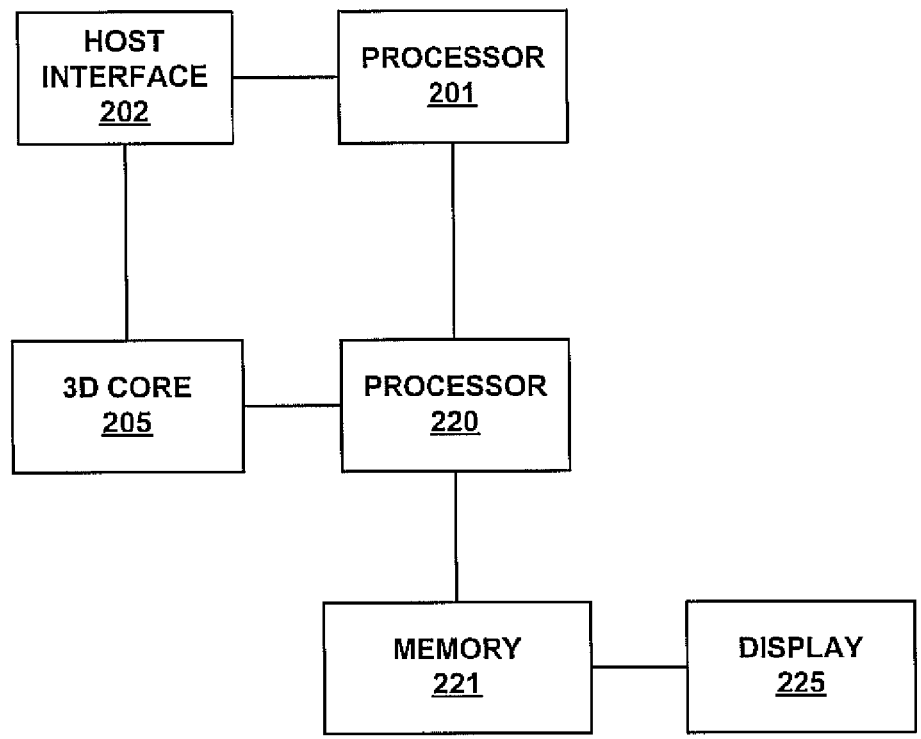
FIG. 2A is a block diagram of a computer system in accordance with one embodiment of the present invention is shown.

With reference now to FIG. 2A, a computer system 200 in accordance with one embodiment of the present invention is shown. Computer system 200 may provide the execution platform for implementing certain software-based functionality of the present invention. As depicted in FIG. 2, the computer system 200 includes a CPU 201 coupled to a 3-D processor 205 via a host interface 202. The host interface 202 translates data and commands passing between the CPU 201 and the 3-D processor 205 into their respective formats. Both the CPU 201 and the 3-D processor 205 are coupled to a memory 221 via a memory controller 220. In the system 200 embodiment, the memory 221 is a shared memory, which refers to the property whereby the memory 221 stores instructions and data for both the CPU 201 and the 3-D processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

As shown in FIG. 2A, system 200 shows the basic components of a computer system platform that may implement the functionality of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized 10 devices, and the like.

Figure 2B:
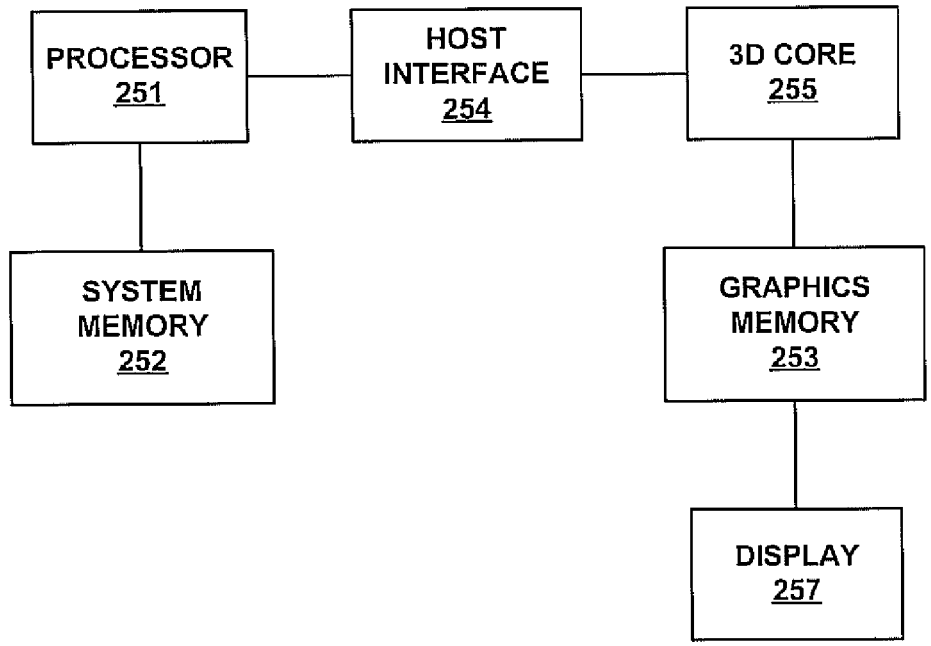
FIG. 2B is a block diagram of a computer system in accordance with one alternative embodiment of the present invention.

Additionally, it should be appreciated that although the components 201-257 are depicted in FIGS. 2A and 2B as a discrete components, several of the components can be implemented as a single monolithic integrated circuit device (e.g., a single integrated circuit die) configured to take advantage of the high levels of integration provided by modern semiconductor fabrication processes. For example, in one embodiment, the CPU 201, host interface 202, 3-D processor 205, and memory controller 220 are fabricated as a single integrated circuit die.

FIG. 2B shows a computer system 250 in accordance with one alternative embodiment of the present invention. Computer system 250 is substantially similar to computer system 200 of FIG. 2A. Computer system 250, however, utilizes the processor 251 having a dedicated system memory 252, and the 3-D processor 255 having a dedicated graphics memory 253. Host interface 254 translates data and commands passing between the CPU 201 and the 3-D processor 255 into their respective formats. In the system 250 embodiment, the system memory 251 stores instructions and data for processes/threads executing on the CPU 251 and graphics memory 253 stores instructions and data for those processes/threads executing on the 3-D processor 255. The graphics memory 253 stores data the video frame buffer which drives the display 257. As with computer system 200 of FIG. 2A, one or more of the components 251-253 of computer system 250 can be integrated onto a single integrated circuit die.

Figure 3:
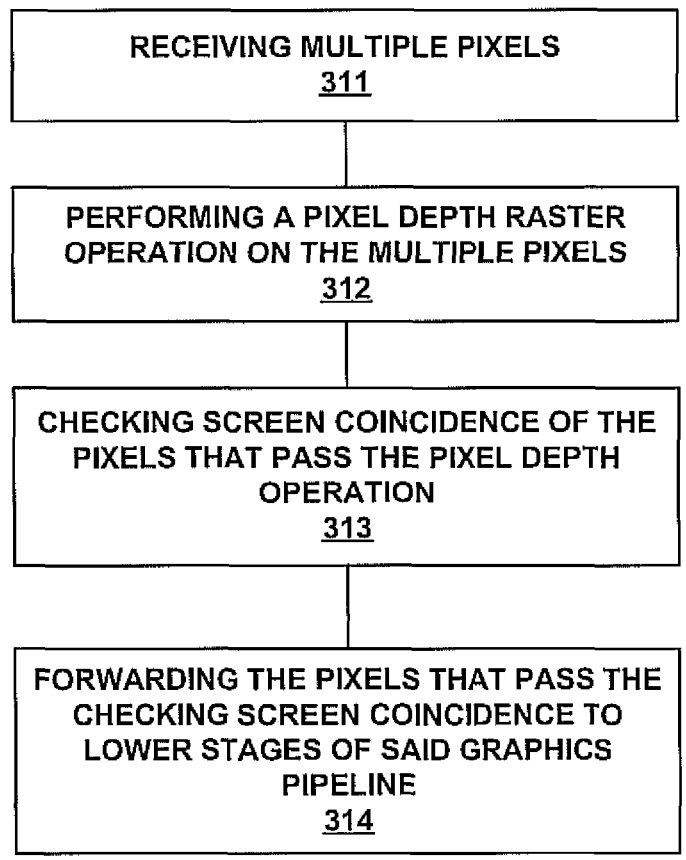
FIG. 3 is a flow chart of pixel processing method in accordance with one embodiment of the present invention.

FIG. 3 is a flow chart of pixel payload processing method 300 in accordance with one embodiment of the present invention. In one embodiment, pixel payload processing method 300 is performed by stages of a graphics processing pipeline. In one embodiment process 300 is performed by graphics pipeline 100. Instructions directing process 300 can be stored as instructions on a computer readable medium and executed on a processor.

In block 311 multiple pixel information is received. In one embodiment of the present invention, the multiple pixel packet information is included in a graphics pipeline raster stage (e.g., raster stage 110). In one exemplary implementation, receiving pixel packet information also includes retrieving pixel surface attribute values. The pixel surface attribute values can be inserted in the pixel packet row.

At block 312 a pixel depth raster operation on the multiple pixels is performed. In one embodiment, the pixel depth raster operation is done at a faster rate than a color raster operation. In one exemplary implementation, the pixel depth raster operation is performed on four pixels at a time and the pixels that are discarded are finished faster than the pixels that are forwarded for color raterizing. The depth determination includes analyzing if a pixel associated with the pixel packet information is occluded. For example, a depth comparison of Z values is performed to determine if another pixel already processed and written to a frame buffer is in "front" of a pixel currently entering a data fetch stage. If there is another pixel already processed and in front the current pixel fails the Z test and the current pixel is discarded or removed from further processing. If there is not another pixel already processed and in front the current pixel passes the Z test and the process proceeds to step 313.

The pixels that pass the pixel depth operation are checked for screen coincidence in block 313. The "flight" through the pipeline or processing of the multiple pixels that are forwarded to the lower stages of said graphics pipeline is tracked. In one embodiment, a scoreboard is checked for an indication of a screen coincidence. In one exemplary implementation bits in a scoreboard representing screen positions of pixels that are entering the downstream pipeline portion are set and to check subsequent pixels a determination is made if the scoreboard contains a set bit that is associated with a screen position of the subsequent pixel. Propagation of a pixel is stalled in response to detecting screen coincidence with another pixel.

In step 314 pixels that pass the screen coincidence checking are forwarded to lower stages of the graphics pipeline for downstream processing. The flight or processing of the pixel in the lower stages is variable. In one embodiment, execution shader program is and indeterminate length and a pixel can pass through or recirculate through the lower stages multiple times. In one embodiment, a downstream data write module reports to an upstream scoreboard module that the particular pixel packet has propagated through the graphics pipeline. In this way, written and are marked as retired.

Thus, the present invention facilitates efficient and effective pixel processing. The present invention enables power conservation by eliminating occluded pixels early in the pipeline while coordinating tracking of variable length pipeline processing operations. The depth rasterizing can be performed on multiple pixels at a faster rate than the color rastering while timing issues associated with forwarded pixels that make multiple passes through the pipeline stages are handled.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. In the claims, the order of elements does not imply any particular order of operations, steps, or the like, unless a particular element makes specific reference to another element as becoming before or after.

What is claimed is:

1. A graphics processing system comprising:
  a scoreboard component for tracking pixels that are still in flight and being worked on in a downstream stage of a pipeline; and
  a raster component in a processor which eliminates occluded pixels early in said pipeline and color rasterizes non-occluded pixels and stalls screen coincident pixels within said pipeline in accordance with said scoreboard component, wherein said scoreboard component tracks pixels that are still in flight in said raster component and pixels that have passed through said raster component but have not exited a write stage, and said scoreboard and program sequencing handle timing issues arising from some pixels being discarded while other pixels proceed to lower stages of the pipeline, wherein said pixels that are discarded and said other pixels that proceed to lower stages of the pipeline are Z depth rasterized at substantially the same time, wherein said eliminating occluded pixels includes not clocking payload portions of a pixel packet through said pipeline while continuing to clock sideband portions of said pixel packet through said pipeline, and said program sequencing directs execution of indeterminate length shader programs by executing them in portions.

2. The graphics processing system of claim 1 wherein said raster component comprises:
  a z rasterizing component for eliminating occluded pixels early in said pipeline; and
  a color rasterizing component for performing color rasterizing.

3. The graphics processing system of claim 1 wherein a Z raster is done at a faster rate than a color raster.

4. The graphics processing system of claim 1 wherein a Z raster is done at a rate 4 times faster than a color raster.

5. The graphics processing system of claim 1 wherein said scoreboard component also indicates that a pixel is not in flight and being worked on in a downstream stage of said pipeline if said pixel is eliminated by said raster component.

6. The graphics processing system of claim 1 further comprising pixel value processing including recirculating values associated with a pixel in said pipeline.

7. A method of processing pixels in a graphics pipeline comprising:
  receiving multiple pixels;
  performing a pixel depth raster operation on said multiple pixels;
  checking screen coincidence of each one of said multiple pixels that pass said pixel depth raster operation;
  forwarding each one of said multiple pixels that pass said checking screen coincidence to lower stages of said graphics pipeline;
  stalling propagation of a pixel in said graphics pipeline in response to detecting screen coincidence with another pixel in said graphics pipeline; and
  handling timing issues arising from some pixels being discarded while other pixels proceed to lower stages of the pipeline, wherein said pixels that are discarded and said other pixels that proceed to lower stages of the pipeline are Z depth rasterized at substantially the same time, wherein discarding occluded pixels includes not clocking payload portions of a pixel packet through said pipeline while continuing to clock sideband portions of said pixel packet through said pipeline, and program sequencing directs execution of indeterminate length shader programs is performed by executing them in portions.

8. A method as described in claim 7 wherein said pixel depth raster operation comprises discarding a pixel that is occluded.

9. A method as described in claim 7 wherein said pixel depth raster operation is done at a faster rate than a color raster operation.

10. A method as described in claim 7 further comprising tracking flight of said multiple pixels that are forwarded to programmable lower stages of said graphics pipeline, wherein said flight is variable.

11. A method as described in claim 7 wherein said first pixel completes processing within said graphics pipeline-when a data write stage writes said pixel to a memory subsystem or is discarded.

12. A method as described in claim 7 wherein said checking screen coincidence comprises:
  setting bits in a scoreboard representing screen positions of pixels that are entering a downstream pipeline portion; and
  determining if said scoreboard contains a set bit that is associated with a screen position of a subsequent pixel.

13. A method as described in claim 7 further comprising directing execution of an indeterminate length shader program.

14. A graphics processing system comprising:
- a scoreboard component for tracking an encoded screen position of pixels that are still in flight and being worked on in a downstream stage of a pipeline;
- a raster component in a processor which eliminates occluded pixels early in a pipeline-and color rasterizes non-occluded pixels and stalls screen coincident pixels within said pipeline-in accordance with said scoreboard component; and
- a program sequence component for controlling the operation of downstream stages of said pipeline in the execution of programmable shader operations on said pixels forwarded from said raster component and directing notification to said scoreboard component of a pixel that has completed processing in lower stages of said pipeline, and said scoreboard and program sequencing component handle timing issues arising from some pixels being discarded while other pixels proceed to lower stages of the pipeline, wherein said pixels that are discarded and said other pixels that proceed to lower stages of the pipeline are Z depth rasterized at substantially the same time, wherein said eliminating occluded pixels includes not clocking payload portions of a pixel packet through said pipeline while continuing to clock sideband portions of said pixel packet through said pipeline, and said program sequencing directs execution of indeterminate length shader programs by executing them in portions.

15. A graphics processing system of claim 14 wherein said raster component rasterizes multiple pixels in parallel.

16. A graphics processing system of claim 15 wherein said raster component forwards pixels that pass depth testing to said scoreboard component and said scoreboard component checks said forwarded pixels for screen coincidence with pixels that are still in flight.

17. A graphics processing system of claim 15 wherein said program sequence component controls multiple passes of said pixels through said pipeline.

* * * * *